United States Patent [19]

Kaji et al.

[11] Patent Number: 4,922,879
[45] Date of Patent: May 8, 1990

[54] INTAKE ARRANGEMENT FOR INTERNAL COMBUSTION ENGINE

[75] Inventors: Yasumasa Kaji, Toyota; Toru Takaki, Oobu, both of Japan

[73] Assignee: Nippondenso Co., Ltd., Kariya, Japan

[21] Appl. No.: 218,586

[22] Filed: Jul. 12, 1988

[30] Foreign Application Priority Data

Aug. 3, 1987 [JP] Japan .................................. 62-193907

[51] Int. Cl.$^5$ ............................................. F02D 41/18
[52] U.S. Cl. .................................... 123/494; 123/339; 73/118.2
[58] Field of Search ............... 123/339, 494, 585, 587; 73/118.1, 118.2; 364/510

[56] References Cited

U.S. PATENT DOCUMENTS

| | | | |
|---|---|---|---|
| 4,527,530 | 7/1985 | Abe et al. | 123/494 |
| 4,612,895 | 9/1986 | Kuroiwa et al. | 123/494 |
| 4,617,889 | 10/1986 | Nishimiya et al. | 123/339 |
| 4,702,210 | 10/1987 | Yasuoka et al. | 123/339 |
| 4,713,765 | 12/1987 | Abe et al. | 123/494 X |

FOREIGN PATENT DOCUMENTS

| | | |
|---|---|---|
| 0107958 | 6/1981 | Japan . |
| 0105519 | 6/1984 | Japan . |
| 0122915 | 7/1984 | Japan . |

Primary Examiner—Willis R. Wolfe
Attorney, Agent, or Firm—Cushman, Darby & Cushman

[57] ABSTRACT

In an air intake arrangement of an internal combustion engine, a throttle valve is rotatably provided within a throttle body and an inlet of a bypass pipe which bypasses the throttle valve is provided upstream the throttle valve at a location where the throttle valve is moved downward at the time of opening thereof. An air flow meter is provided upstream the throttle valve within the throttle body. The location of the air flow meter is biased or offset from the longitudinal axis of the throttle body toward a portion below which the throttle valve is moved upward at the time of opening thereof.

9 Claims, 5 Drawing Sheets

INTAKE ARRANGEMENT FOR INTERNAL COMBUSTION ENGINE

BACKGROUND OF THE INVENTION

The present invention relates to an intake system or arrangement for an internal combustion engine, integrally incorporating a throttle valve for regulating the flow rate of intake air delivered to cylinders of the internal combustion engine, and an air flow meter for determining the total flow rate of intake air flowing through an intake pipe by measuring local flow rate of the intake air.

Japanese Patent Provisional Publication (Kokai) Nos. 59-105519 and 59-122915 disclose intake systems.

In those known intake systems, a hot-wire flow meter is disposed within a throttle body at a position where the measuring accuracy of the hot-wire flow meter will not be deteriorated even if the air flow speed distribution within the throttle body varies according to the degree of opening of the throttle valve.

The inlet of a bypass pipe for delivering bypass air therethrough around the throttle valve to the engine to promote the warm-up of the engine, and the inlet of a bypass for delivering bypass air therethrough around the throttle valve to the engine to maintain the engine idling speed at a desired value during idling are provided in the throttle body upstream the throttle valve. Accordingly, the air flowing through the bypasses also causes the variation of the flow speed distribution of the air flowing through the throttle body.

Nevertheless, in those systems, only the influence of the movement of the throttle valve on the flow distribution is taken into account, and hence the influence of air flowing through the bypasses on the flow speed distribution within the throttle body deteriorates the accurate measurement of flow rate.

SUMMARY OF THE INVENTION

It is an object of the present invention to provide an intake system or arrangement for an internal combustion engine, incorporating an air flow meter for determining the flow rate of intake air having a flow rate detector, capable of measuring the flow rate of intake air in a sufficiently high accuracy even if the flow rate detector is disposed in an area where the measuring function of the flow rate detector is affected by the air flowing through the bypasses or the degree of opening of the throttle valve.

According to the invention, an inlet opening of a bypass pipe is formed in the wall of an intake pipe at a position slightly upstream the closed position of one half portion of a throttle valve which moves downstream with respect to the direction of flow of the intake air when the throttle valve is opened, and a flow rate detector of an air flow meter is disposed at a position biased from the longitudinal axis of the intake pipe to the other half portion of the throttle valve which moves upstream with respect to the direction of flow of the intake air when the throttle valve is opened.

DETAILED DESCRIPTION OF THE PREFERRED EMBODIMENT

Figure 1:
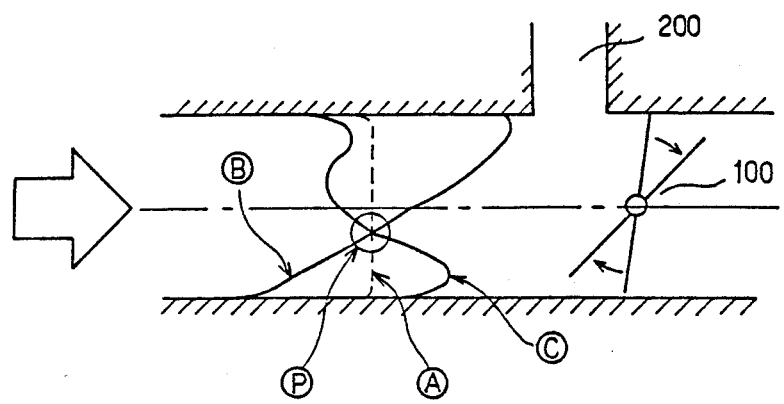
FIG. 1 is a chart showing distribution of air flow speed of an intake air in an intake pipe.

In FIG. 1, a broken line A indicates a flow speed distribution of intake air when a throttle valve 100 is fully opened and a bypass 200 is fully closed, a solid line B indicates a flow speed distribution when the throttle valve 100 is fully closed and the bypass 200 is fully opened, and a solid line C indicates a flow speed distribution when the degree of opening of the throttle valve 100 is approximately 60° and the bypass 200 is fully closed. As obvious from FIG. 1, when a flow rate detector of an air flow meter is disposed at a position P, where the influence of the degree of opening of the throttle valve 100 and the intake air flowing through the bypass 200 on flow rate measurement is very small, errors in measuring the flow rate of the intake air can be reduced to the least extent.

Figure 2:
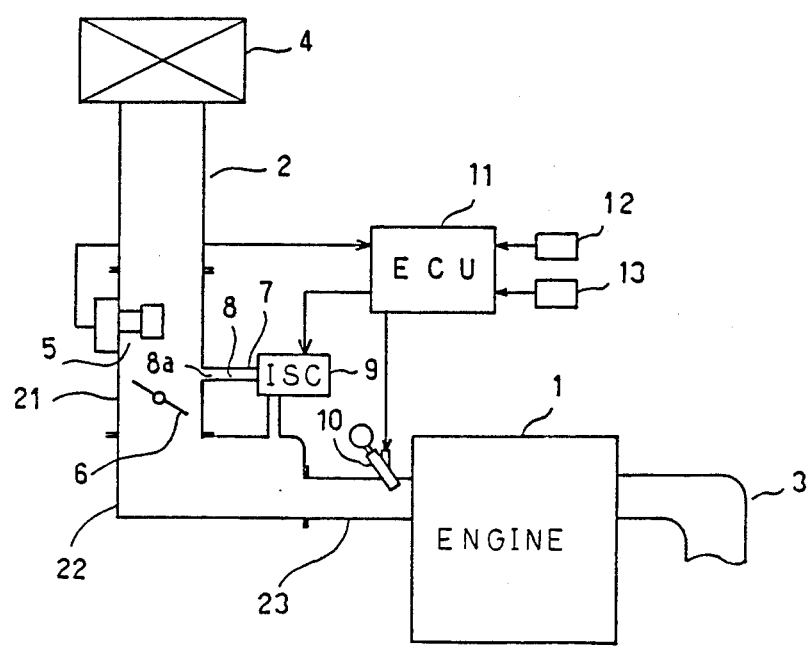
FIG. 2 is a schematic diagram showing an embodiment of the present invention.

FIG. 2 schematically shows an internal combustion engine 1 and associated equipment. An intake pipe 2 and an exhaust pipe 3 are connected to the internal combustion engine 1. An air cleaner 4 is connected to the upper end of the intake pipe 2. The intake pipe 2 includes upper intake pipe connected to the air cleaner 4, a throttle body 21, a surge tank 22 and an intake manifold 23 which are manufactured separately but are connected to each other as shown in FIG. 3.

An air flow meter 5 and a throttle valve 6 are provided in the throttle body 21. An inlet opening 8a of a bypass 8 formed in a bypass pipe 7 bypassing the throttle valve 6 to the surge tank 22 is formed in the wall of the throttle body 21 at a position upstream the throttle valve 6. An ISC (idling speed control) valve 9 for opening and closing the bypass 8 according to the operating conditions of the engine 1 to regulate the idling speed is provided in the bypass pipe 7. An electromagnetic fuel injection valve 10 is provided on the intake manifold 23.

An electronic control unit (hereinafter abbreviated as ECU) 11 receives a signal representing an air flow rate from the air flow meter 5, a signal representing an engine speed from an engine speed sensor 12, and a signal representing the temperature of the engine cooling water from a temperature sensor 13, and controls the ISC valve 9, the fuel injection valve 10 and an ignition system, not shown, in a conventional manner.

Figure 3:
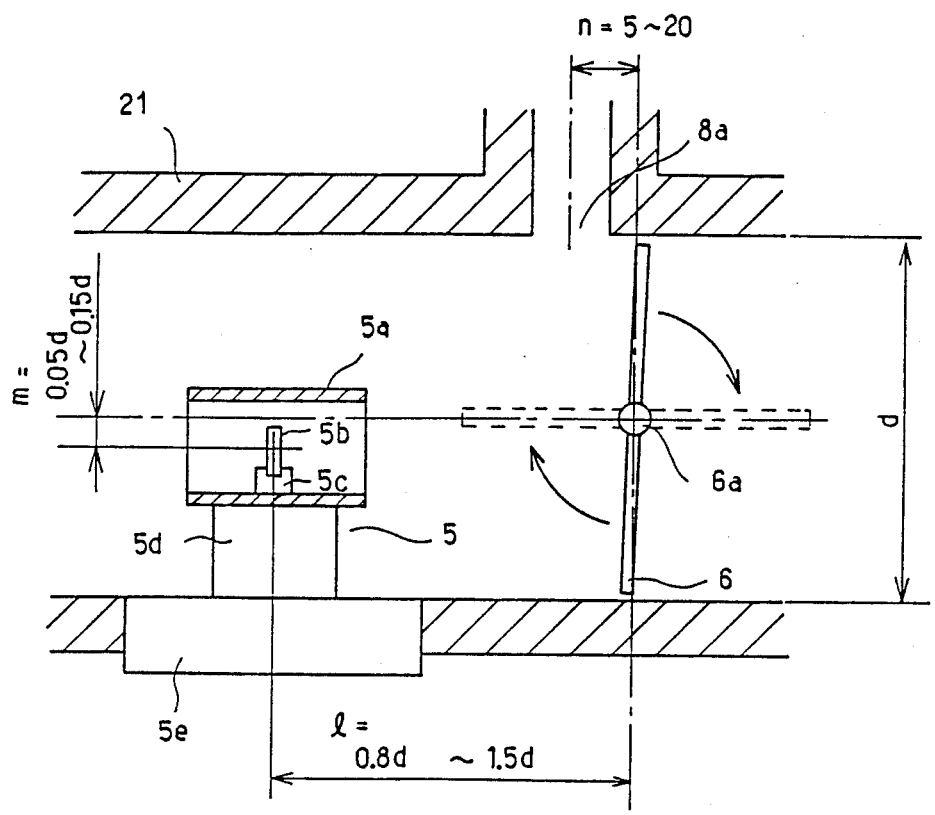
FIG. 3 is a cross-sectional view showing a detailed structure of a throttle body shown in FIG. 2.

As shown in FIG. 3, the air flow meter 5 for measuring local air flow rate comprises an air guide tube 5a, a heat sensitive element 5b having a platinum resistor formed on a silicon substrate by evaporation and disposed substantially at the middle of the air guide tube 5a, a first holding member 5c holding the heat sensitive element 5b so that the major surfaces of the heat sensitive element 5b extend in parallel to the flow of intake air and one minor surface of the heat sensitive element 5b extending along the longer side thereof faces opposite to the flow of intake air, a second holding member 5d holding the air guide tube 5a within the throttle body 21, and an electronic circuit 5e internally having a signal processing circuit which supplies power to the platinum resistor of the heat sensitive element 5b, receives an electric signal corresponding to the resistance of the platinum resistor of the heat sensitive element 5b, and converts the electric signal into a signal representing an air flow rate. Conductive lines for electrically interconnecting the platinum resistor of the heat sensitive element 5b and the processing circuit of the circuit 5e are provided on the first holding member 5c and the second holding member 5d.

The throttle valve 6 is of a butterfly type fixed to a shaft 6a rotatably provided through the throttle body 21 diametrically across the same. The shaft 6a turns through an angle proportional to the movement of an accelerator pedal, not shown, operated by a driver to open the throttle valve 6 at a degree of opening corresponding to the movement of the accelerator pedal. Thus, a first half (lower half in the Figure) and a second half (upper half in the Figure) of the valve 6 are moved in upstream and downstream directions relative to the shaft 6a when the valve 6 is opened.

Figure 4:
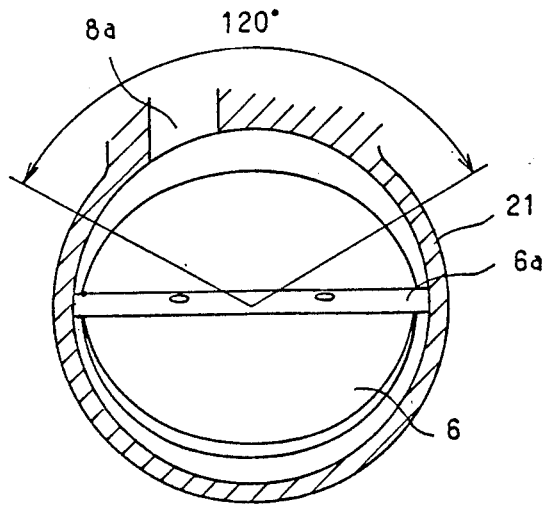
FIG. 4 is a cross-sectional view showing a detailed structure of bypass pipe shown in FIG. 3.

The inlet opening 8a of the bypass is formed in the wall of the throttle body 21 on the side of the second half side of the throttle valve 6 which moves downstream with respect to the direction of flow of intake air when the throttle valve 6 is opened, at a position slightly upstream the closed position of the throttle valve 6. The inlet opening 8a is formed in the wall of the throttle body 21 on the side of the second half side of the throttle valve 6 which moves downstream when the throttle valve 6 is opened in an central angular range of 120° in the cross section of the throttle body 21 as shown in FIG. 4.

As shown in FIG. 3, the air flow meter 5 is attached to the throttle body 21 so that the heat sensitive element 5b is positioned upstream and near the throttle valve 6 and is biased slightly from the longitudinal axis of the throttle body 21 to the side of the first half side of the throttle valve 6 which moves upstream when the throttle valve 6 is opened.

Figure 5:
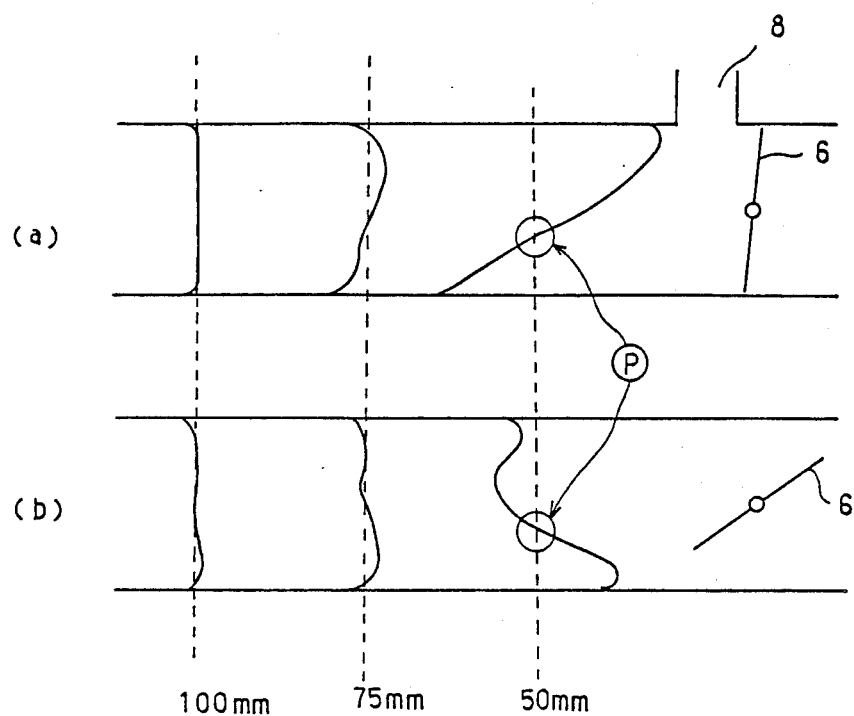
FIGS. 5, a and b are a chart showing distribution of air flow speed of an intake air upstream the throttle valve shown in FIG. 3.

In FIG. 5 showing flow speed distributions obtained through experiments, (a) shows a flow speed distribution when the throttle valve 6 is fully closed and the bypass 8 is fully opened by the ISC valve 9, and (b) shows a flow speed distribution when the throttle valve 6 is opened through an angle of 60° and the bypass 8 is fully closed by the ISC valve. In this experiment, the inside diameter of the throttle body 21 is d = 55 mm, the diameter of the inlet opening 8a of the bypass 8 is 12 mm, the distance between the shaft 6a of the throttle valve 6 and the center of the inlet opening 8a is n = 10 mm.

As obvious from (a) and (b) of FIG. 5, the speed distribution at a position upstream the throttle valve 6 by approximately 100 mm is scarcely affected by the degree of opening of the throttle valve 6 and the bypass 8. The intake air flowing through the inlet opening 8a, and the flow rate of the intake air flowing through the throttle body 21 can be determined with a sufficiently small error of measurement on the basis of a local flow rate measured by the heat sensitive element 5b regardless of the position of the heat sensitive element 5b within the throttle body provided that the air flow meter 5 is positioned more than 75 mm apart from the fully closed position of the throttle valve 6. However, the speed distribution of the intake air at a position about 50 mm upstream the fully closed position of the throttle valve 6 within the throttle body 21 varies significantly depending on the degree of opening of the throttle valve 6 and the mode of flow of the intake air flowing into the inlet opening 8a.

However, as obvious from FIG. 1 showing, in combination, the flow speed distributions shown in (a) and (b) of FIG. 5 at a position 50 mm upstream the throttle valve 6 and the speed distribution when the throttle valve 6 is fully opened and the bypass 8 is fully closed, the air flow speed at the position P where the heat sensitive element 5b of FIG. 3 is positioned is affected scarcely by the degree of opening of the throttle valve 6 and the variation of the intake air flowing into the bypass 8 and remains substantially constant.

That is, an intake air flow rate determined on the basis of a signal representing a local flow rate provided by the heat sensitive element 5b disposed at the position as shown in FIG. 3 relative to the throttle valve 6 and the inlet opening 8a opening into the interior of the throttle body 21 at the position upstream the throttle valve 6 scarcely contains any error of measurement attributable to the variation of the degree of opening of the throttle valve 6 and the flow of the intake air into the bypass 8.

Particularly, as shown in FIG. 3, when the inlet opening 8a of the bypass 8 is formed upstream the throttle valve 6 with the center thereof at a distance in the range of n = 5 to n = 20 mm from the shaft 6a of the throttle valve 6, and the heat sensitive element 5b of the air flow meter 5 is placed upstream the throttle valve 6 with the center thereof positioned at a distance in the range of l = 0.8d to l = 1.5d (d is the inside diameter of the throttle body 21 expressed in millimeters) from the shaft 6a of the throttle valve 6, the error of measurement can be restricted to a sufficiently small value by biasing the center of the heat sensitive element 5b by a distance in the range of m = 0.5d to m = 0.15d from the longitudinal axis of the throttle body 21 to the first half side of the throttle valve 6 which moves upstream when the throttle valve 6 is opened.

Figure 6:
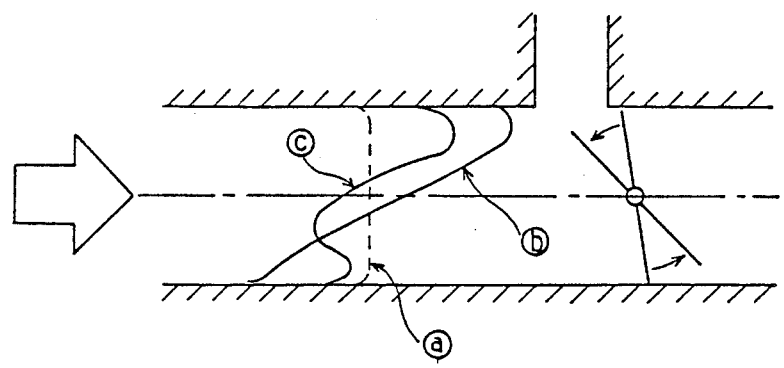
FIG. 6 is a chart showing flow velocity of an intake air in the intake pipe in the case of intake system different from the embodiment shown in FIG. 3.

In a system shown in FIG. 6 in which the inlet opening 8a of the bypass 8 is formed in the wall of the throttle body 21 on the side of the first half side of the throttle valve 6 which moves upstream when the throttle valve 6 is opened, there is not any position as the position ⓟ at which the flow rate of the intake air is stable and is not affected by the degree of opening of the throttle valve 6 and the intake air flowing into the bypass 8. In FIG. 6, a curve indicated at ⓐ represents a flow speed distribution when the throttle valve 6 is fully opened and the bypass 8 is fully closed, a curve indicated at ⓑ represents a flow speed distribution when the throttle valve 6 is fully closed and the bypass 8 is fully opened, and a curve indicated at ⓒ represents a flow speed distribution when the throttle valve 6 is opened by an angle of 60° and the bypass 8 is fully closed.

The effects of this intake system shown in FIGS. 2 through 5 will be described with reference to the results of experiments shown in FIGS. 7 through 10.

Figure 7:
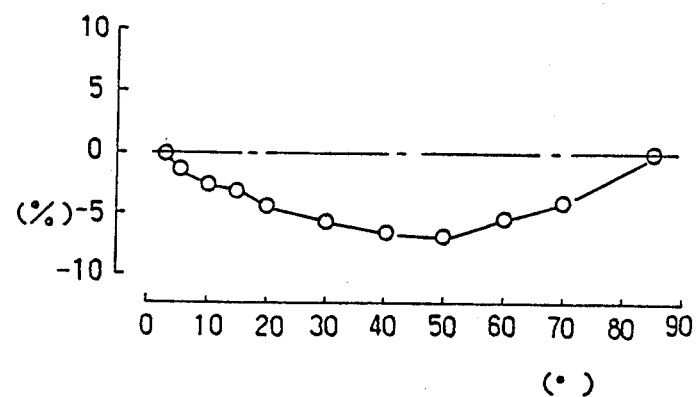
FIGS. 7 through 10 are graphs showing results of experiments conducted with respect to the embodiment of the present invention.
Figure 8:
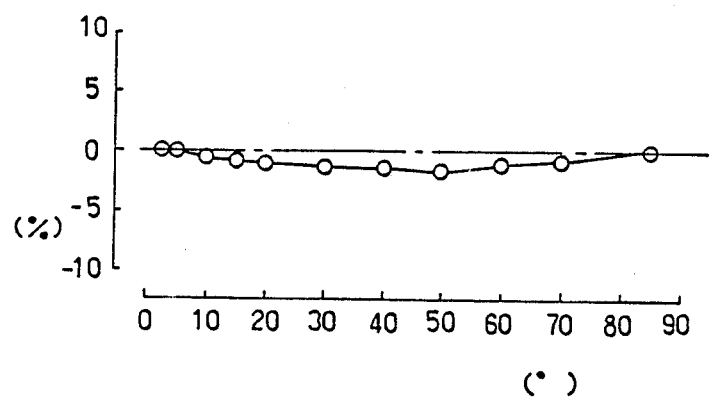

FIG. 7 shows the variation of the error of measurement in the flow rate of intake air with respect to the degree of opening of the throttle valve 6 when the inlet opening 8a of the bypass 8 is positioned as shown in FIG. 3 but kept closed and the heat sensitive element 5b of the air flow meter 5 is placed with the center thereof on the longitudinal axis of the throttle body 21. FIG. 8 shows the variation of the error of measurement in the flow rate of intake air with respect to the degree of opening of the throttle valve 6 when the intake system is constituted as shown in FIG. 3 and the bypass 8 is kept closed. As obvious from the comparative consideration of FIGS. 7 and 8, the error of measurement in the flow rate in the intake system of FIG. 3 is −2.5% at the maximum whereas the maximum error of measurement in the intake system in which the heat sensitive element 5b of the flow meter 5 is disposed with the center thereof on the longitudinal axis of the throttle body 21 is as high as −7%.

Figure 9:
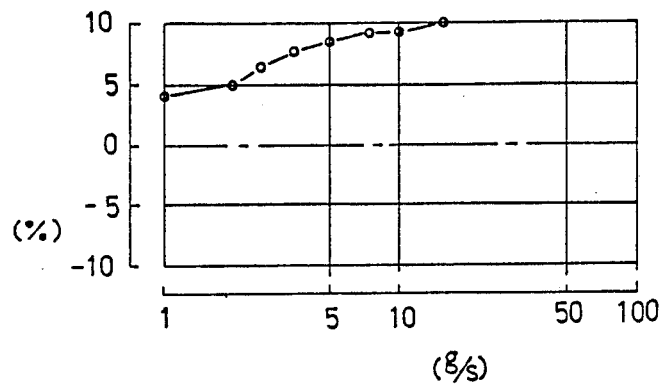
Figure 10:
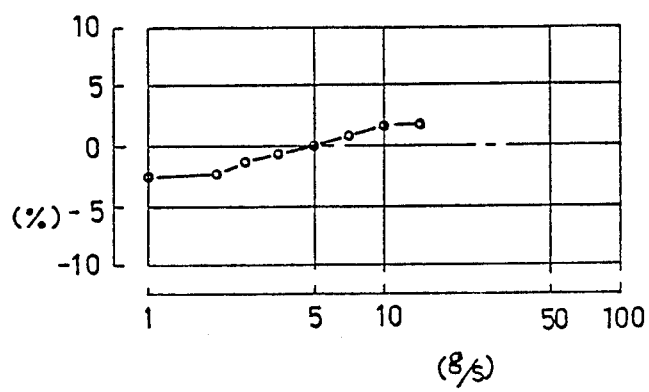

FIGS. 9 and 10 show the dependence of the error of measurement in measuring the flow rate of intake air on the flow rate of intake air when the flow rate of intake air flowing through the bypass 8 with the throttle valve 6 fully closed is varied from the minimum value to the maximum value respectively in the intake system used in the experiments for obtaining the results shown in FIG. 7 and in the intake system shown in FIG. 3. As obvious from FIGS. 9 and 10, the error of measurement in the flow rate in the intake system of FIG. 3 is in the range of ± 3% (FIG. 10), whereas the maximum error of measurement in the flow rate in the intake system in which the heat sensitive element 5b is disposed with the center thereof on the longitudinal axis of the throttle body 21 is as high as +10% (FIG. 9).

As apparent from the foregoing description, the intake system of the present invention is able to measure the flow rate of the intake air with an insignificant error of measurement even if the heat sensitive element 5b of the air flow meter 5 is disposed in an area in which the flow speed distribution is dependent on the degree of opening of the throttle valve 6 and the flow rate of the intake air in the bypass 8.

Although the air flow meter employed in foregoing embodiment for determining the flow rate of intake air on the biasis of a local flow rate is a hot-wire flow meter, the air flow meter is not limited to such a type, but may be any air flow meter capable of determining the total flow rate on the basis of a local flow rate. Furthermore, although the foregoing embodiment has the ISC valve 9 in the bypass 8 to control the idling speed, an air valve for promoting the warm-up of the engine 1 may be provided in the bypass 8 instead of the ISC valve 9. Still further, the intake system need not be provided with only one bypass 8, but may be provided with a plurality of bypasses.

As apparent from the foregoing description, according to the present invention, the flow rate of the intake air can accurately be determined even if the air flow meter for determining the flow rate of intake air on the basis of a local flow rate is disposed in an area in which the flow speed distribution is affected by the degree of opening of the throttle valve and the flow rate of intake air in the bypass, and, since the flow meter can be disposed within the throttle body and near the throttle valve, the intake system can be formed in a compact construction.

What we claim is:

1. An air intake arrangement for an internal combustion engine having at least one intake manifold comprising:
    an intake pipe defining a first air passage therein;
    a throttle body provided between said intake pipe and said intake manifold of said engine and defining therein a second air passage which has a central longitudinal axis in communication with said first air passage;
    a throttle valve rotatably provided in said second air passage of said throttle body for controlling an air flow amount flowing into said intake manifold, said throttle valve including a rotatable shaft and a valve plate having a first half portion and a second half portion, said first half portion rotated in an upstream direction and said second half portion rotated in a downstream direction with respect to a direction of air flow respectively, relative to said rotatable shaft to open said throttle valve and allow air flow into said intake manifold; and
    an air flow sensor provided in said second air passage upstream of said throttle valve for sensing a local air flow amount flowing through said second passage, said air flow sensor being located at a local position spaced from said longitudinal axis of said second air passage toward said first half portion of said valve plate so that the local air flow amount is sensed only at said local position upstream said first half portion of said valve plate.

2. An air intake arrangement according to claim 1 further comprising:
    a bypass pipe defining a third air passage bypassing said throttle valve, said bypass pipe opening into said second air passage of said throttle body at a location between said throttle valve and said air flow sensor and on a side of said second half portion of said valve plate.

3. An air intake arrangement according to claim 2, wherein said air flow sensor includes a temperature responsive element exposed to intake air flow in said second air passage for sensing the local air flow amount.

4. An air intake arrangement for an internal combustion engine comprising:
    intake passage means for supplying said engine with intake air;
    throttle valve means provided in said intake passage means for controlling an amount of intake air supplied to said engine, said throttle valve means having a rotatable shaft and a valve plate having first and second half portions, said first half portion rotated in an upstream direction and said second half portion rotated in a downstream direction relative to a flow of said intake air respectively, when opened;
    bypass passage means for supplying said engine with bypass air, said bypass passage means having an air inlet and an outlet opening into said intake passage means upstream and downstream said throttle valve means, respectively, and said inlet opening at a location adjacent to said second half portion of said valve plate; and
    sensor means exposed to air flow in said intake passage means upstream of said throttle valve means for sensing a local intake air amount only at a local position displaced from a longitudinal axis of said intake passage means toward said first portion of said valve plate, said local position being spaced from a central axis of said intake passage means toward said first half portion.

5. An air intake arrangement according to claim 4, wherein said air inlet of said bypass passage means is formed upstream of said throttle valve means with a center of said bypass passage at a distance in the range of 5 to 20 mm from said rotatable shaft of said throttle valve means, and said sensor means is located upstream of said throttle valve means with said center thereof positioned at a distance in the range of 0.5 to 1.5 times an inside diameter of said intake passage means from said rotatable shaft.

6. An air intake arrangement according to claim 5, wherein said local position is spaced at a distance in the range of 0.5 to 0.15 times said inside diameter of said intake passage from said central axis of said intake passage means toward said first half portion.

7. An air intake arrangement for an internal combustion engine comprising:
   intake passage means for supplying said engine with intake air;
   throttle valve means provided in said intake passage means for controlling an amount of intake air supplied to said engine, said throttle valve means having a rotatable shaft and a valve plate including first and second half portions, said first half portion rotated in an upstream direction and said second half portion rotated in a downstream direction, respectively, when opened;
   bypass passage means for supplying said engine with bypass air, said bypass passage means having an air inlet and an outlet opening into said intake passage means upstream and downstream of said throttle valve means, respectively, and said inlet opening at a location adjacent to said second half portion of said valve plate; and
   sensor means including a temperature responsive element exposed to intake air flow in said intake passage means upstream said throttle valve means for sensing a local intake air amount, said temperature responsive element being located at a local position spaced from a central axis of said intake passage means toward said first half portion of said valve plate so that said local air amount is sensed only at said local position upstream said first half portion of said valve plate.

8. A method of sensing air flow rate near a throttle valve that is within a throttle body comprising the steps of:
   choosing a distance upstream of said throttle valve where air flow at a central axis of said throttle body changes with changing position of said throttle valve;
   determining a local position spaced toward a side of said throttle valve that moves upstream to open said throttle valve, where said air flow does not change with changing position of said throttle valve;
   providing an air flow sensor at said local position; and
   sensing an air flow rate by using said air flow sensor.

9. A method according to claim 8, wherein said distance is in the range of 0.8 to 1.5 times an inside diameter of said throttle body, and said local position is spaced at another distance in the range of 0.05 to 0.15 times said inside diameter from said central axis of said throttle body.

* * * * *